United States Patent [19]
Kraft

[11] Patent Number: 5,774,979
[45] Date of Patent: Jul. 7, 1998

[54] MODULAR CABLING SYSTEM AND METHOD FOR INSTALLING SAME

[76] Inventor: James L. Kraft, 4751 Fox La., Hellam, Pa. 17406

[21] Appl. No.: 676,671

[22] Filed: Jul. 10, 1996

[51] Int. Cl.$^6$ .................................................. H04Q 1/06
[52] U.S. Cl. .......................... 29/857; 174/38; 379/327; 379/328
[58] Field of Search .......................... 29/857; 379/329, 379/328, 327, 326; 174/38, 43

[56] References Cited

U.S. PATENT DOCUMENTS

| | | | |
|---|---|---|---|
| 4,002,856 | 1/1977 | Sedlacek et al. | 179/98 |
| 4,037,910 | 7/1977 | Paluch | 339/198 R |
| 4,117,273 | 9/1978 | Gautier et al. | 179/98 |
| 4,145,853 | 3/1979 | Bridwell | 52/221 |
| 4,158,754 | 6/1979 | Yonezaki et al. | 179/98 |
| 4,320,261 | 3/1982 | Scerbo et al. | 179/98 |
| 4,352,146 | 9/1982 | Hermanutz et al. | 361/428 |
| 4,390,755 | 6/1983 | Pierresteguy | 179/98 |
| 4,831,726 | 5/1989 | Moly | 29/857 |
| 4,835,858 | 6/1989 | Adlon et al. | 29/857 |
| 4,860,168 | 8/1989 | Wiljanen et al. | 361/428 |
| 4,964,020 | 10/1990 | Savage et al. | 361/429 |
| 5,078,613 | 1/1992 | Salmon | 439/92 |
| 5,083,369 | 1/1992 | Cerda | 29/857 |
| 5,422,946 | 6/1995 | Delakowitz et al. | 379/327 |

OTHER PUBLICATIONS

Siecor Corporation, Fiber Cabling Solutions for Premises Networks, Feb. 1996.
IES Technologies, FutureSmart Interactive Network, 1995.

*Primary Examiner*—James F. Coan
*Attorney, Agent, or Firm*—Dann, Dorfman, Herrell and Skillman, P.C.

[57] ABSTRACT

A method of installing a cabling system for interconnecting a plurality of devices at an installation site to a network is disclosed. The process includes the steps of prefabricating a plurality of identical equipment racks and equipping each of the equipment racks identically with at least one cable interconnection means. The method also includes the steps of prefabricating a plurality of multiconductor cables formed in lengths dimensioned according to the physical layout of an installation site, providing a plurality of multiconductor connectors, each connector being adapted for terminating one of said plurality of multiconductor cables and for facilitating the connection of one or more devices to one of said multiconductor cables, and grouping one of the equipment racks with said plurality of multiconductor cables and with a set of the multiconductor connectors to form a complete cabling system for an installation site.

17 Claims, 6 Drawing Sheets

MODULAR CABLING SYSTEM AND METHOD FOR INSTALLING SAME

FIELD OF THE INVENTION

This invention relates to local computer and communication networks and in particular to a process for installing a modular cabling system for interconnecting a plurality of devices at a site to a communications network.

BACKGROUND OF THE INVENTION

The past few years have seen explosive growth in the use of "high technology" in both residential and commercial buildings. Such "high technology" includes computer-controlled heating ventilating and air conditioning systems (HVAC), security alarm systems, and fire detection and alarm systems. Moreover, there is continuing work in establishing remote reading systems for reading gas, water, and electric utility meters. A further development has been the explosive growth of personal computers in homes and businesses and the use of data communications services in connection with such computers. Moreover, there is an increasing utilization of computers in the home for monitoring and controlling a plurality of systems, the so-called "smart home".

The growth in the use of such equipment has resulted not only in an increased demand for computer and communications equipment, but also for cabling systems to facilitate the interconnection of diverse pieces of equipment with one another and to telecommunications networks and other carriers. Although standards have been established for various types of computer equipment and network cabling components, there has been no standardization with respect to the assembly and installation of network cabling systems for homes or commercial buildings.

Typically, a builder will specify and purchase various items of equipment such as HVAC equipment, security systems, and fire alarm systems from various vendors. The local utility provides its own metering or interconnection equipment. The telecommunications and cable TV carriers provide their own interconnection equipment. Moreover, The ultimate owners or tenants will purchase various types of computer, communication, and network hardware from one or more manufacturers and/or resellers. However, the builder and/or occupant must contract with one or more installers to install, configure, and interconnect the various items of equipment. Hitherto, the building or home network cabling and cabling equipment has been assembled and installed on a site-by-site basis, often by more than one entity. Thus, the cabling system at each building is completely unique relative to other buildings or homes of similar construction.

The lack of standardized installation configurations results in multiple, sometimes redundant or conflicting, cabling systems being installed. Moreover, the lack of a single cabling scheme for a building often complicates simple changes when a piece of equipment, a new system, or a computer workstation is modified, moved, or added by the owner or occupant of the home or commercial building. Further still, substantial installation cost savings can be realized by using modular cabling systems because each system does not have to be uniquely configured and wired.

SUMMARY OF THE INVENTION

The problems associated with the known methods for installing cabling systems for computer and communication networks at a plurality of unrelated residential or commercial sites are solved to a large degree by a method of installing a cabling system for interconnecting a plurality of devices to a network. The method includes the steps of providing a plurality of cabling kits, each configured for an installation site. Each of the cabling kits includes a prefabricated equipment rack, at least one cable interconnection device mounted on the equipment rack for providing an interconnection to a network, a plurality of multiconductor distribution cables formed in lengths dimensioned according to the physical layout of an installation site, and a plurality of multiconductor connectors, each formed for connection to one of said plurality of multiconductor cables for facilitating the connection of a device or piece of equipment to one of said multiconductor cables. The process includes the further step of installing at least one of said cabling kits at an installation site.

In accordance with another aspect of the present invention there is provided a method of installing a cabling system for interconnecting a plurality of devices at an installation site to a network. The process includes the steps of prefabricating a plurality of identical equipment racks and equipping each of said equipment racks identically with at least one cable interconnection means. The method also includes the steps of prefabricating a plurality of multiconductor cables formed in predetermined lengths and selected according to the physical layout of an installation site. A plurality of multiconductor connectors are each adapted for terminating one of said plurality of multiconductor cables and for facilitating the connection of one or the devices to one of said multiconductor cables. The prefabricated equipment racks are grouped with a plurality of multiconductor cables and with a set of the multiconductor connectors to form a complete cabling system for an installation site.

BRIEF DESCRIPTION OF THE DRAWINGS

The foregoing summary as well as the following detailed description of a preferred embodiment of the present invention will be better understood when read in conjunction with the appended drawings, wherein.

DETAILED DESCRIPTION

Figure 1:
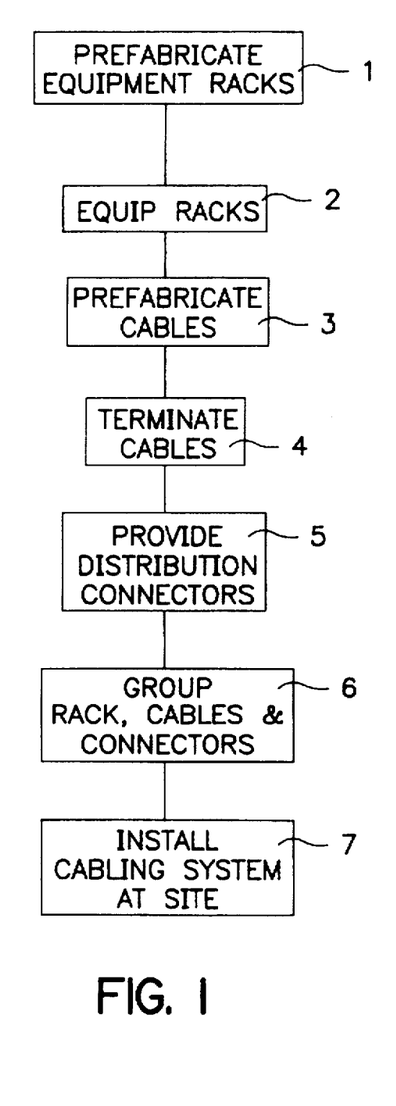
FIG. 1 is a block diagram showing the steps of a process according to the present invention.

Referring now to the drawings wherein like reference numerals refer to the same or similar components across the several views, and in particular to FIG. 1, there are shown the basic steps in carrying out the installation of a modular cabling system in accordance with the present invention. In Step 1, a plurality of equipment racks are prefabricated and in Step 2 the racks are equipped with one or more pieces of equipment as specified or necessary for a particular installation. In Step 3, a plurality of multiconductor cables are prefabricated. The lengths and number of conductors are selected in accordance with the physical layout and equipment requirements specified for the installation site. It will be appreciated by those skilled in the art that for certain types of installations, such as residential housing developments, the multiconductor cable sets will be essentially the same. However, in the case of commercial buildings, which are usually unique from building to building, the sets of multiconductor cables are formed from combinations of pre-cut lengths of cable.

In Step 4, the multiconductor cables are terminated to facilitate their connection to the rack-mounted equipment, individual pieces of equipment at the site, or to distribution connectors located throughout the installation site. The distribution connectors are provided in Step 5 in accordance with the requirements of a particular site, or in the case of houses, in accordance with the home design.

In Step 6 the equipment racks, cables, and distribution connectors are grouped into kits for each installation site and then installed at the respective sites in Step 7.

Figure 2:
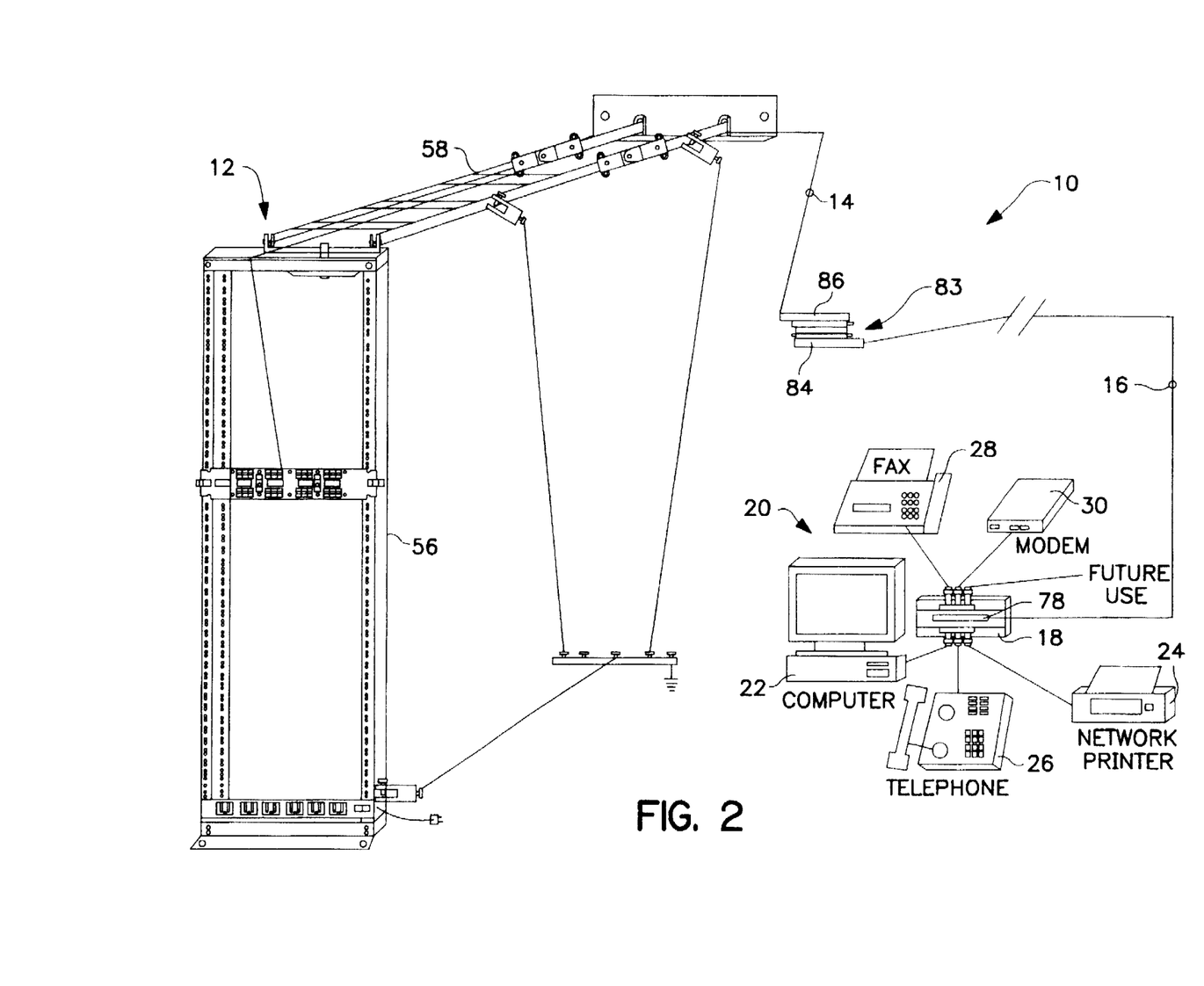
FIG. 2 is a schematic diagram of a basic cabling system as installed according to the present invention.

Referring now to FIG. 2, there is shown an installation of a basic cabling system kit 10 according to the process of this invention. The cabling system kit includes an equipment rack 12, a jumper cable 14, a distribution cable 16, and a distribution outlet or connector 18. The distribution connector 18 is located in a room or station 20 containing one or more devices that are to be connected to an internal or external network. The station 20 may include one or more pieces of data processing or communications equipment. It may also include HVAC equipment, a security or fire alarm system, or entertainment equipment, such as audio and video devices. In some instances the station will include utility metering devices such as electric, gas, or water meters.

In the embodiment shown in FIG. 2, station 20 includes a personal computer 22, a network printer 24, a telephone 26, fax machine 28, and a modem 30. Those skilled in the art will appreciate that station 20 may include fewer items than those shown and described, or in some cases, may include additional pieces of equipment. The distribution outlet 18 has a plurality of jacks into which cables from the various pieces of equipment at workstation 20 are plugged.

Figure 3:
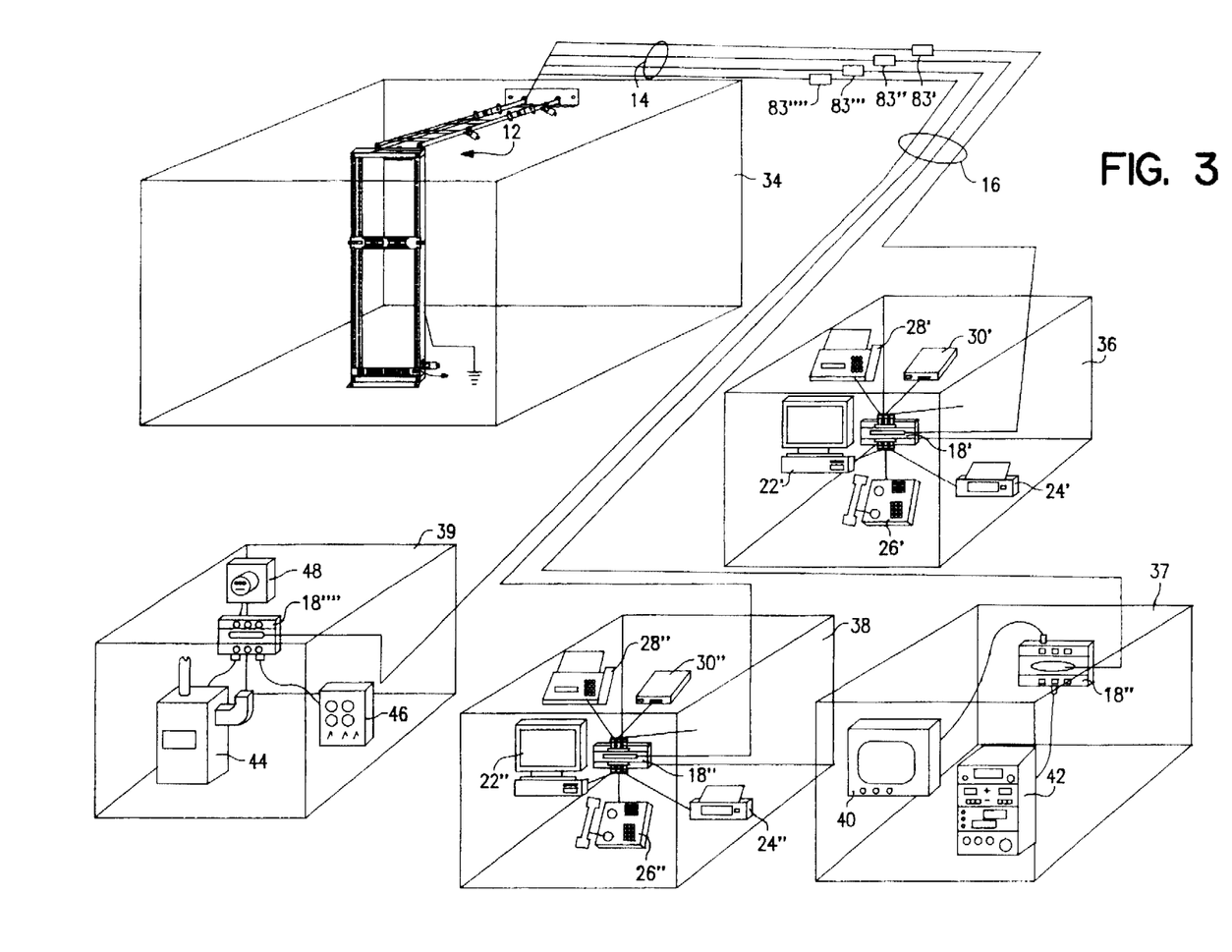
FIG. 3 is a schematic diagram of an installation of a cabling system according to this invention at a home or business site having several connectable devices and items of equipment.

Shown in FIG. 3 is a typical layout of a cabling system for a single site having multiple rooms or stations. The equipment rack 12 is located in an interconnection room or closet 34, or in the case of a residence, a basement or attic. The multiconductor distribution cables 16 run from the interconnection room 34 to each of a plurality of stations. The stations are typically located in various parts of the home or business. For example, in the embodiment shown in FIG. 3 there are computer/communication stations of the type shown in FIG. 2 located in rooms 36 and 38. An entertainment room 37 contains a television or monitor 40 and a stereo/video rack 42. A utility room 39 contains various types of utility equipment such as a furnace/air conditioning unit 44, a security or fire alarm system 46, and an electric meter 48. The multiconductor distribution cables 16 are prefabricated with respect to length in order to accommodate the physical layout of the installation site. Although the embodiment shown and described herein utilizes multiconductor, twisted-pair cables, it is within the scope of this invention to utilize coaxial or fiber optic cables as necessary.

Figure 4:
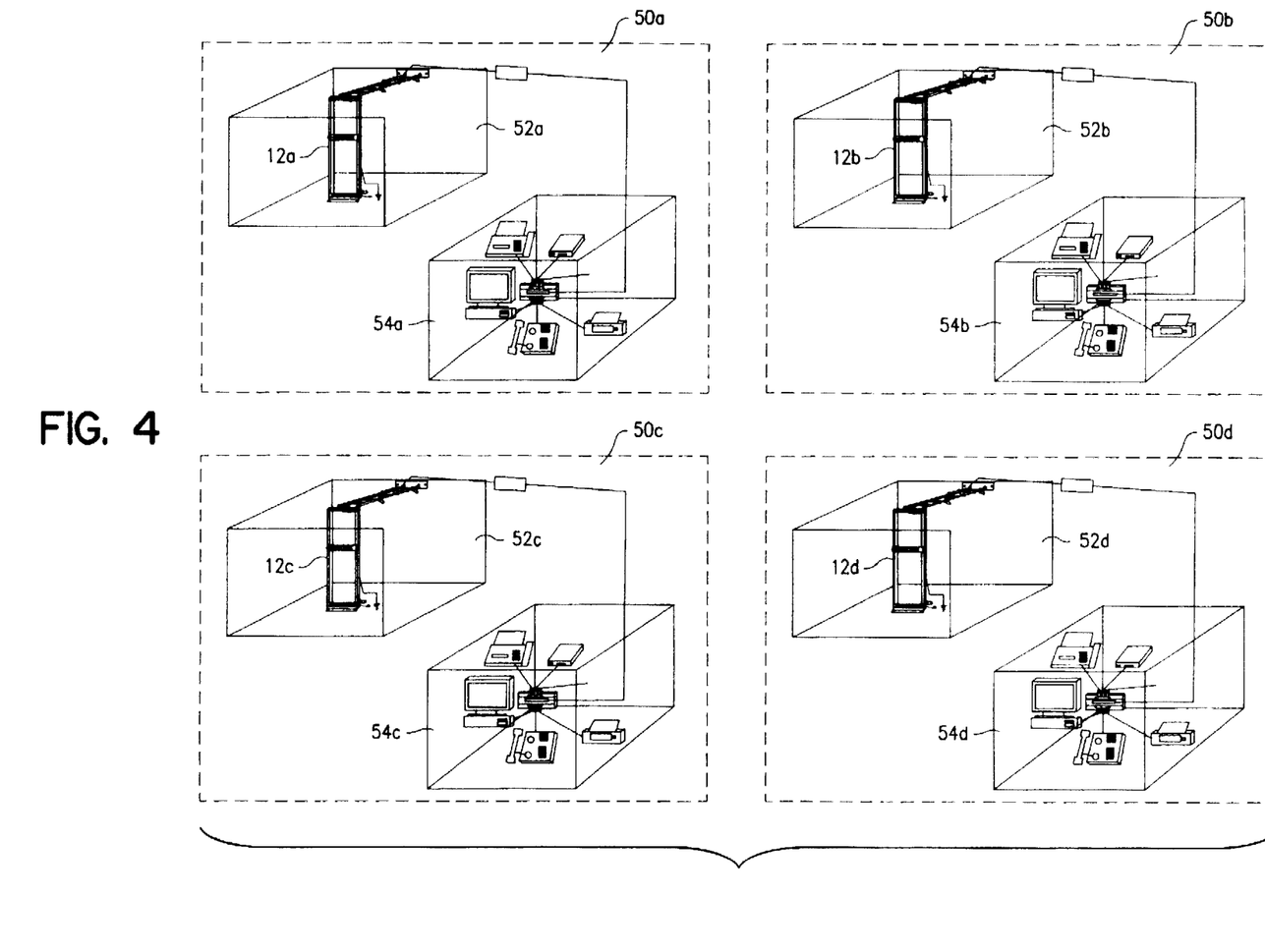
FIG. 4 is a schematic diagram showing the use of the modular cabling system of FIG. 2 in a plurality of homes or commercial sites.

Referring now to FIG. 4, there is shown the result of the preparation and installation of a modular cabling system according to the method of the present invention. A number of homes 50a, 50b, 50c, and 50d located in a development are identically equipped. Although only computer and communications equipment and only a single station or room is shown, it will be appreciated that the actual number of rooms or stations will be greater, as shown in FIG. 3.

Each of the homes 50a, 50b, 50c, and 50d includes a communication/interconnection room or closet 52a, 52b, 52c, and 52d, within which the cabling system equipment racks 12a, 12b, 12c, and 12d, are respectively located. Multiconductor jumper cables 14a, 14b, 14c, and 14d interconnect the equipment racks with respective multiconductor distribution cables 16a, 16b, 16c, and 16d. The multiconductor distribution cables are routed from the respective computer rooms to the various rooms or stations 54a, 54b, 54c, and 54d of the home or business. Each station at the respective site has a distribution outlet 18a, 18b, 18c, and 18d to which the various pieces of data processing, communication, or other equipment are connected.

The cabling systems of each of the sites 40a, 40b, 40c, and 40d are configured essentially identically with respect to the equipment racks, jumper and distribution cables, and the distribution outlets. For homes that are substantially of the same design, there would be no significant difference in the distribution cable kits because the basic layout would not vary significantly from house to house. However, in the case of commercial buildings, one difference between the various sites would be with respect to the lengths of the distribution cables because each commercial building is likely to have a different physical layout from another building. Another difference would be in the number of stations which must be served by the local cabling system, which is likely to be different for a commercial site compared to a home.

Figure 5:
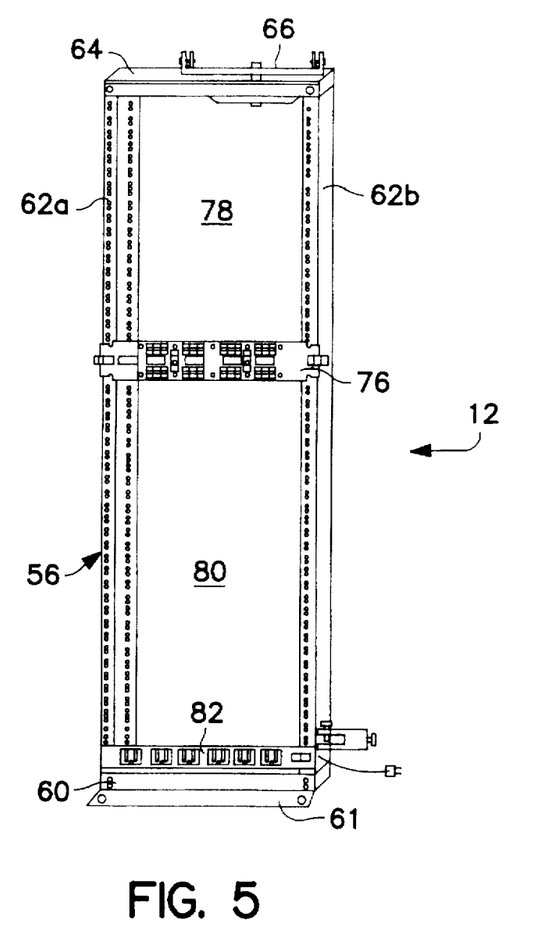
FIG. 5 is a perspective view of a vertical section of the equipment rack shown in FIG. 2, for use in a cabling system according to the present invention.

Referring back to FIG. 2, the equipment rack 12 is preferably formed in two sections, a vertical section 56 and a horizontal section 58. The vertical section 56 is constructed and arranged for supporting various items of data, communication, and interconnection equipment, and the horizontal section 58 is constructed and arranged for supporting a plurality of the jumper cables 14. Shown in FIG. 5 is a preferred arrangement for vertical section 56 of equipment rack 12. A support base 60 is connected to a pair of vertical columns 62a and 62b. The support base 60 is adapted for mounting on a floor and includes a flange 61 having holes formed therein for receiving anchoring devices such as bolts or studs. The vertical columns 62a, 62b are bolted to the support base 60, although other suitable means of attachment can be used, such as welding.

A cross member 64 is connected to the other ends of columns 62a and 62b distal from the support base 60. A hinge bracket 66 is fixedly mounted on the cross member 64. A multi-port patch panel 76 is mounted on the equipment rack 12. The number of patch panels used for a given installation will depend on the number of rooms or stations served by the local cabling system. Patch panel 76 is preferably of the type having clusters of modular jacks on one side, each cluster connected to a multiconductor cable terminal on the other side. The jumper cables 14 are prefabricated for connection to the multiconductor cable terminals on the patch panel 76. The patch panel 76 can alternatively be of the type that utilizes punch-down blocks instead of the modular jacks.

Patch panel 76 is disposed centrally on the vertical rack section 56 so as to provide space for additional equipment. For example, area 78 above the patch panel 76 may be designated for electronic data equipment such as a network hub, a medium attachment unit (MAU), a data switch, a router, a bridge, a repeater, or a combination of such devices. Area 80 below the patch panel 76 may be designated for voice and/or video communication equipment such as a telephone key system, WAN equipment, modems, video distribution equipment, or a combination of such devices. A power strip 82 is also mounted adjacent the base support 60 to provide a source of electric power to any rack mounted equipment that requires electric power. Vertical rack section 56 can also be configured to accommodate various other items relating to electric power distribution including power conditioning devices, uninterruptible power supplies (UPS), power surge arresters, or a combination of such devices.

The equipment rack 12 used in the cabling system according this invention is prefabricated and equipped prior to shipment to the intended installation site or to a builder for installations at several sites. In this manner, the equipment racks for multiple sites are identically configured according to the specification of the builder or occupant. Furthermore, for residential or commercial developments, the equipment installed on the racks is identically arranged according to a predefined scheme to facilitate installation by the building or housing contractor.

Figure 6:
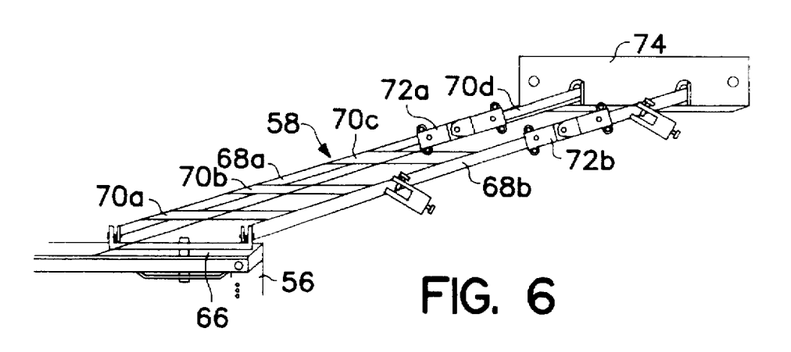
FIG. 6 is a perspective view of a horizontal section of the equipment rack shown in FIG. 2.

Referring now to FIG. 6, the horizontal section 58 of equipment rack 12 includes a pair of parallel rails 68a, 68b. A plurality of rungs 70a, 70b, 70c, and 70d are connected between rails 68a and 68b in spaced relationship to one another. The rails 68a, 68b are connected at one end thereof to the hinge bracket 66. In this manner, horizontal rack section 58 can pivot relative to vertical rack section 56. Rails 68a, 68b, are equipped with respective hinges 72a and 72b to permit folding or collapsing of horizontal rack section 58. That feature simplifies handling and transportation of the equipment rack 12. A wall bracket 74 is mounted at the end of rails 68a, 68b of the horizontal rack section 58 distal from the hinge bracket 66 for anchoring the equipment rack 12 to a vertical wall.

Referring again to FIG. 2, an interconnection 83 is provided for facilitating the connection of distribution cable 16 to jumper cable 14. The interconnection 83 includes a male strain relief connector 84 which is connected to one end of distribution cable 16. A female strain relief connector 86 terminates an end of jumper cable 14. A similar strain relief terminal connector 88 is connected terminates the other end of distribution cable 16 to facilitate connecting the cable to the distribution outlet 18. Jumper cable 14 is terminated at its other end with an appropriate connector for connecting to the back of the patch panel 76. In the cabling system kit according to this invention, the jumper cables 14 and the distribution cables 16 are prefabricated with the appropriate strain relief connectors so that they can simply be pulled in and plugged in as required.

In view of the foregoing description and the accompanying drawings, the novel features and advantages of the modular cabling system according to the present invention are now apparent. A novel method for providing and installing a cabling system has been described. It will be readily appreciated that the present invention will greatly facilitate the installation and maintenance of cabling systems at a plurality of residential or commercial sites because there is no discretion on arranging the local equipment on the rack or in its wiring during installation at the particular site. The use of the disclosed method eliminates the dependency on a local site installer with respect to the configuration of the rack equipment and wiring scheme. Furthermore, the prefabrication of the multiconductor cables facilitates installation at the various work sites because it eliminates the need for on-site cable termination and checking of the cables. The building or home contractor need only pull in the cables and plug them into the appropriate connectors at the site.

It will be recognized by those skilled in the art that changes or modifications may be made to the above-described invention without departing from the broad inventive concepts of this invention. It is understood, therefore, that the invention is not limited to the particular embodiments disclosed herein, but is intended to cover all modifications and changes which are within the scope of the invention as defined in the appended claims.

What is claimed is:

1. A method of installing a cabling system for interconnecting a plurality of devices to a network, said method comprising the steps of:

providing a plurality of cabling kits, each configured for an installation site, each of said cabling kits comprising:

a prefabricated equipment rack;

a cable interconnection means mounted on said equipment rack for providing an interconnection to a network;

a plurality of multiconductor distribution cables formed in lengths dimensioned according to the physical layout of an installation site; and a plurality of multiconductor connectors, each connector formed for connection to one of said plurality of multiconductor cables for facilitating the connection of a device to one of said multiconductor cables;

mounting a patch panel on said equipment rack;

forming a plurality of multiconductor jumper cables for interconnecting said patch panel with said plurality of multiconductor distribution cables;

terminating each of said multiconductor distribution cables with a multiconductor, strain relief connector at each end thereof; and installing one of said cabling kits at an installation site.

2. The method recited in claim 1 wherein the step of providing the plurality of said cabling kits comprises the step of installing data equipment on said equipment rack, said data equipment being selected from the group consisting of a network hub, an MAU, a data-switch, a router, a bridge, a repeater, and a combination thereof.

3. The method recited in claim 1 wherein the step of providing the plurality of said cabling kits comprises the step of installing power equipment on said equipment rack, said power equipment being selected from the group consisting of a power distribution device, a power conditioning device, an uninterruptible power source, a power surge arrestor, and a combination thereof.

4. The method recited in claim 1 comprising the step of terminating each of said multiconductor jumper cables with a multiconductor, strain relief connector at each end thereof.

5. The method recited in claim 1 wherein the step of providing said cabling kits comprises the step of providing a terminal for receiving the strain relief connector on one of said multiconductor cables and a modular jack operatively connected to said terminal.

6. The method recited in claim 5 comprising the step of providing each of said multiconductor connectors with two modular jacks.

7. The method recited in claim 6 comprising the step of providing each of said multiconductor connectors with a plurality of jacks.

8. A method of installing a cabling system for interconnecting a plurality of devices to a network, said method comprising the steps of:

providing a plurality of cabling kits, each configured for an installation site, each of said cabling kits comprising:
(a) a prefabricated equipment rack;
(b) a cable interconnection means mounted on said equipment rack for providing an interconnection to a network;
(c) a plurality of multiconductor distribution cables formed in lengths dimensioned according to the physical layout of an installation site; and
(d) a plurality of multiconductor connectors, each connector formed for connection to one of said plurality of multiconductor cables for facilitating the connection of a device to one of said multiconductor cables;

providing a terminal adapted for receiving a strain relief connector on one of said multiconductor distribution cables and a modular jack operatively connected to said terminal; and installing one of said cabling kits at an installation site.

9. The method recited in claim 8 comprising the step of providing each of said multiconductor connectors with two modular jacks.

10. The method recited in claim 8 comprising the step of providing each of said multiconductor connectors with a plurality of modular jacks.

11. In a method of installing a cabling system for interconnecting a plurality of devices at an installation site to a network, the steps of:

prefabricating a plurality of identical equipment racks;

equipping each of said equipment racks identically with a patch panel;

prefabricating a plurality of multiconductor distribution cables formed in lengths dimensioned according to the physical layout of an installation site;

providing a plurality of multiconductor connectors, each connector being adapted for terminating one end of said plurality of multiconductor cables and for facilitating the connection of one of the devices to one of said multiconductor cables;

forming a plurality of multiconductor jumper cables each adapted for interconnecting one of said patch panels with one of said plurality of multiconductor distribution cables;

terminating each of said multiconductor distribution cables with a multiconductor, strain relief connector at the other end thereof; and grouping one of said equipment racks with said pluralities of multiconductor distribution cables and jumper cables and with a set of said multiconductor connectors to form a complete cabling system for said installation site.

12. The method recited in claim 11 comprising the step of providing a terminal for receiving the strain relief connector on one of said multiconductor distribution cables and a modular jack operatively connected to said terminal.

13. The method recited in claim 12 comprising the step of providing each of said multiconductor connectors with two modular jacks.

14. The method recited in claim 12 comprising the step of providing each of said multiconductor connectors with a plurality of modular jacks.

15. The method recited in claim 11 comprising the step of installing data equipment on said equipment rack, said data equipment being selected from the group consisting of a network hub, an MAU, a data-switch, a router, a bridge, a repeater, and a combination thereof.

16. The method recited in claim 11 comprising the step of installing power equipment on said equipment rack, said power equipment being selected from the group consisting of a power distribution device, a power conditioning device, an uninterruptible power source, a power surge arrestor, and a combination thereof.

17. The method recited in claim 11 comprising the step of terminating each of said multiconductor jumper cables with a multiconductor, strain relief connector at each end thereof.

* * * * *